United States Patent
Jeong et al.

(10) Patent No.: US 9,226,214 B2
(45) Date of Patent: Dec. 29, 2015

(54) METHOD AND APPARATUS FOR A TERMINAL TO SELECT A CELL IN A HETEROGENEOUS NETWORK

(75) Inventors: Kyeong In Jeong, Hwaseong-si (KR);
Himke Van Der Velde, Apeldoom (NL);
Gert Jan Van Lieshout, Staines (GB);
Jae Hyuk Jang, Suwon-si (KR); Sang Bum Kim, Seoul (KR); Soeng Hun Kim, Yongin-si (KR)

(73) Assignee: Samsung Electronics Co., Ltd., Suwon-si (KP)

( * ) Notice: Subject to any disclaimer, the term of this patent is extended or adjusted under 35 U.S.C. 154(b) by 82 days.

(21) Appl. No.: 13/883,202

(22) PCT Filed: Nov. 18, 2011

(86) PCT No.: PCT/KR2011/008850
§ 371 (c)(1),
(2), (4) Date: May 2, 2013

(87) PCT Pub. No.: WO2012/067467
PCT Pub. Date: May 24, 2012

(65) Prior Publication Data
US 2013/0215787 A1    Aug. 22, 2013

Related U.S. Application Data (60) Provisional application No. 61/415,310, filed on Nov. 18, 2010.

(51) Int. Cl.
*H04L 12/26* (2006.01)
*H04W 36/30* (2009.01)
*H04W 48/18* (2009.01)
*H04W 24/10* (2009.01)

(52) U.S. Cl.
CPC .............. *H04W 36/30* (2013.01); *H04W 48/18* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 2003/0045320 A1* | 3/2003 | Tanno et al. ................... | 455/522 |
| 2006/0233138 A1* | 10/2006 | Park .............................. | 370/332 |
| 2010/0080166 A1* | 4/2010 | Palanki et al. ................ | 370/315 |
| 2011/0110251 A1* | 5/2011 | Krishnamurthy et al. .... | 370/252 |
| 2011/0211467 A1* | 9/2011 | Bhat ............................. | 370/252 |
| 2011/0312319 A1* | 12/2011 | Lindoff et al. ................ | 455/423 |
| 2012/0044818 A1* | 2/2012 | Lindoff et al. ................ | 370/252 |

OTHER PUBLICATIONS

CATT."Discussion on the Design of ABS Pattern and its Impact on the Measurement."3GPP Draft: R1-105935. 3GPP TSG RAN WG1 meeting #63 Jacksonville, USA, Nov. 15, 2010.
QUALCOMM."LTE: Enhanced ICIC-Mobility scenarios."3GPP Draft: R2-106244, 3GPP TSG-RAN WG2 meeting #72 Jacksonville, United States. Nov. 15, 2010.

\* cited by examiner

*Primary Examiner* — Chi H Pham
*Assistant Examiner* — Fahmida Chowdhury
(74) *Attorney, Agent, or Firm* — Jefferson IP Law, LLP (57) ABSTRACT

The present invention relates to a cell selection method of a terminal in a heterogeneous network, and cell selection method of a terminal in a heterogeneous network according to the present invention includes receiving a measurement restriction pattern from a base station; and selecting a cell based on the measurement restriction pattern. According to an embodiment of the present invention, it is possible to select a cell accurately and efficiently.

13 Claims, 8 Drawing Sheets

METHOD AND APPARATUS FOR A TERMINAL TO SELECT A CELL IN A HETEROGENEOUS NETWORK

BACKGROUND OF THE INVENTION

1. Field of the Invention

The present invention relates to a wireless communication system and, in particular, to a cell selection method and apparatus of a terminal in a Long Term Evolution (LTE) system of heterogeneous network.

2. Description of the Related Art

Recently, wireless communication technology has advanced rapidly. With this rapid advance, the communication systems have evolved. Among the recent wireless communication technologies, Long Term Evolution (LTE) is a promising 4$^{th}$ Generation mobile communication standard. An LTE system may include various types of base stations such as macro base station, pico base station, and femto base station according to their deployment positions or purposes. A network in which the diverse types of base stations coexist is referred to as Heterogeneous Network (HetNet). The diameter pico/femto cell is small as compared to that of the macro cell.

In the heterogeneous network, the coverage of the pico/femto base station may be overlapped with or included in the coverage of the macro cell. In this case, it is difficult to expect accurate signal measurement due to the inter-cell interference. In order to solve this problem, inter-cell interference coordination, i.e. Enhanced Inter Cell Interference Coordination (eICIC), technology is used.

Almost Blank Subframe (ABS) is one of the key techniques in the eICIC technology. In LTE, transmission is performed in unit of subframe. ABS is a technique for muting transmission in the serving cell or neighboring cell at a specific subframe. ABS aims to make it possible for the terminal to measure received signal without interference at the corresponding subframe.

Figure 1:
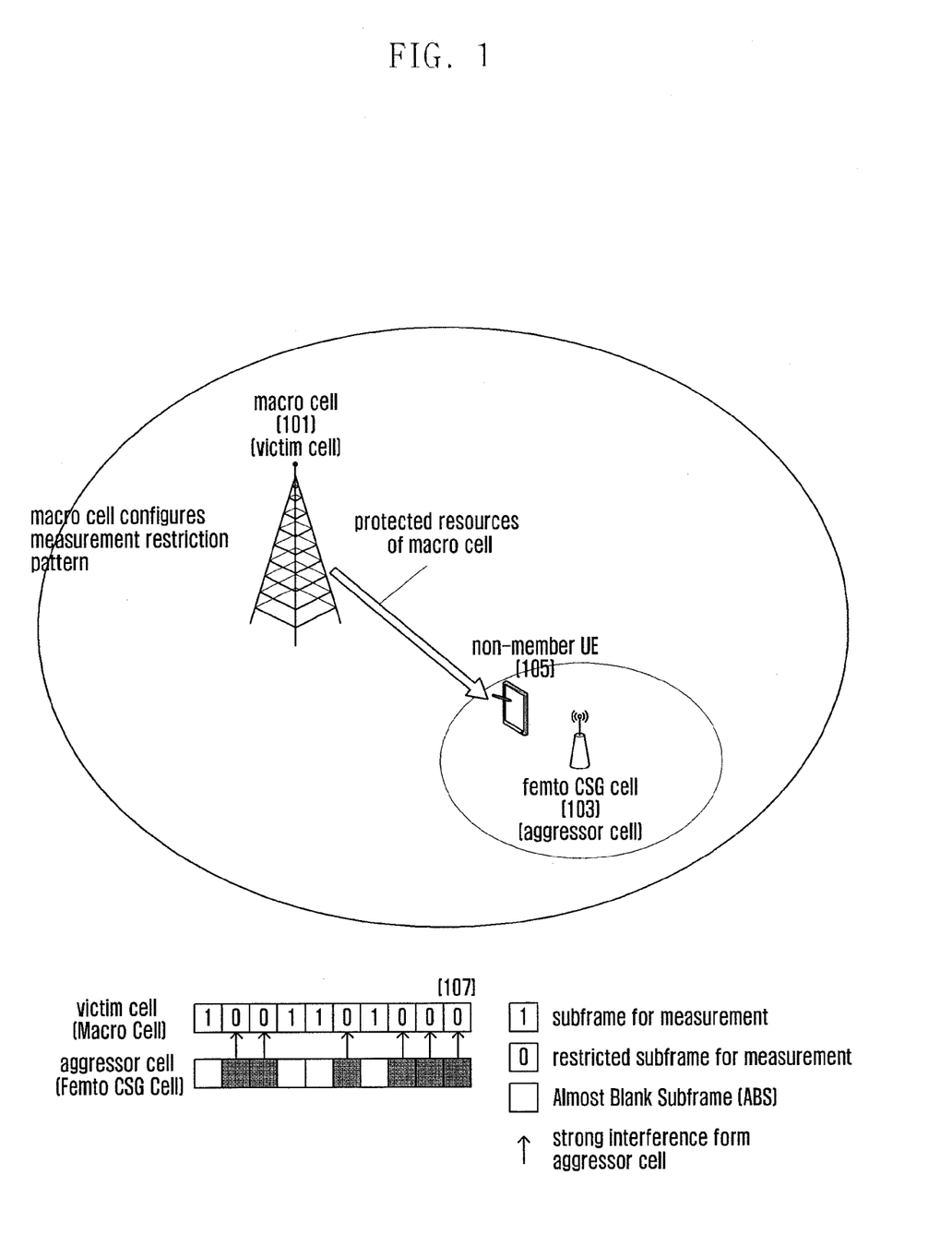
FIG. 1 is a diagram illustrating the HetNet to which ABS technique of eICIC technology is applied.

FIG. 1 is a diagram illustrating the HetNet to which ABS technique of eICIC technology is applied.

Referring to FIG. 1, a femto Closed Subscriber Group (CSG) base station 103 allowing access to restricted users is located within the coverage of the macro base station 101. In the case that the non-CSG terminal 105 in communication with the macro base station 101 moves to approach the femto CSG base station 103, the non-CSG terminal 105 may undergo a problem in communication due to the interference from the femto CSG base station 103. In this case, the macro base station 101 notifies the terminal 105 of a measurement-restricted subframe pattern 107 in the form of a bitmap. If the pattern is received, the terminal 105 suspends measurement at the subframes indicated by 0 in the pattern 107 and performs measurement only at the subframes indicated by 1. The femto CSG base station 130 incurring interference does not transmit signal almost at the subframe indicated by 1 (ABS) so as to avoid interference. The terminal 105 is capable of measuring signal in the interference-mitigated environment.

The eICIC technologies in HetNet that are known so far are almost related to the terminal (UE) connected to the network. According to the conventional method, the base station can control the UE connected to the network directly so as to mitigate interference by controlling the UE. However, there is a need of applying the eICIC of HetNet to the UEs in idle mode that are not controlled by the network. In the HetNet system, the Reference Signal Received Quality/Reference Signal Received Power (RSRQ/RSRP) of the UEs in idle mode varies at every subframe, this influence the cell selection or reselection result. There is therefore a need of determining the subframe for performing cell reselection or reselection based on the signal strength measured thereat. Accordingly, there is a need of modification in UE operation.

DISCLOSURE OF INVENTION

Technical Problem

The present invention has been made in an effort to solve the above problem, and it is an object of the present invention to provide a cell selection method and apparatus of a UE for selecting a cell efficiently and accurately in case of using eICIC technology in the wireless mobile communication system of HetNet environment.

Solution to Problem

In order to accomplish the above object, a cell selection method of a terminal in a heterogeneous network includes receiving a measurement restriction pattern from a base station; and selecting a cell based on the measurement restriction pattern.

In order to accomplish the above object, a terminal for selecting a cell in a heterogeneous network includes a transceiver which receives a measurement restriction pattern from a base station; and a controller which selects a cell based on the measurement restriction pattern.

Advantageous Effects

According to an embodiment of the present invention, the terminal is capable of selecting a cell efficiently and accurately in a heterogeneous network environment.

DETAILED DESCRIPTION OF EXEMPLARY EMBODIMENTS

Exemplary embodiments of the present invention are described with reference to the accompanying drawings in detail.

Detailed description of well-known functions and structures incorporated herein may be omitted to avoid obscuring the subject matter of the present invention. This aims to omit unnecessary description so as to make the subject matter of the present invention clear.

For the same reason, some of elements are exaggerated, omitted or simplified in the drawings and the elements may have sizes and/or shapes different from those shown in drawings, in practice. The same reference numbers are used throughout the drawings to refer to the same or like parts.

Descriptions are made of the cell selection method and apparatus according to the embodiments of the present invention hereinafter with reference to accompanying drawings.

Detailed description of well-known functions and structures incorporated herein may be omitted to avoid obscuring the subject matter of the present invention. Exemplary embodiments of the present invention are described hereinafter with reference to the accompanying drawings in detail.

Figure 2:
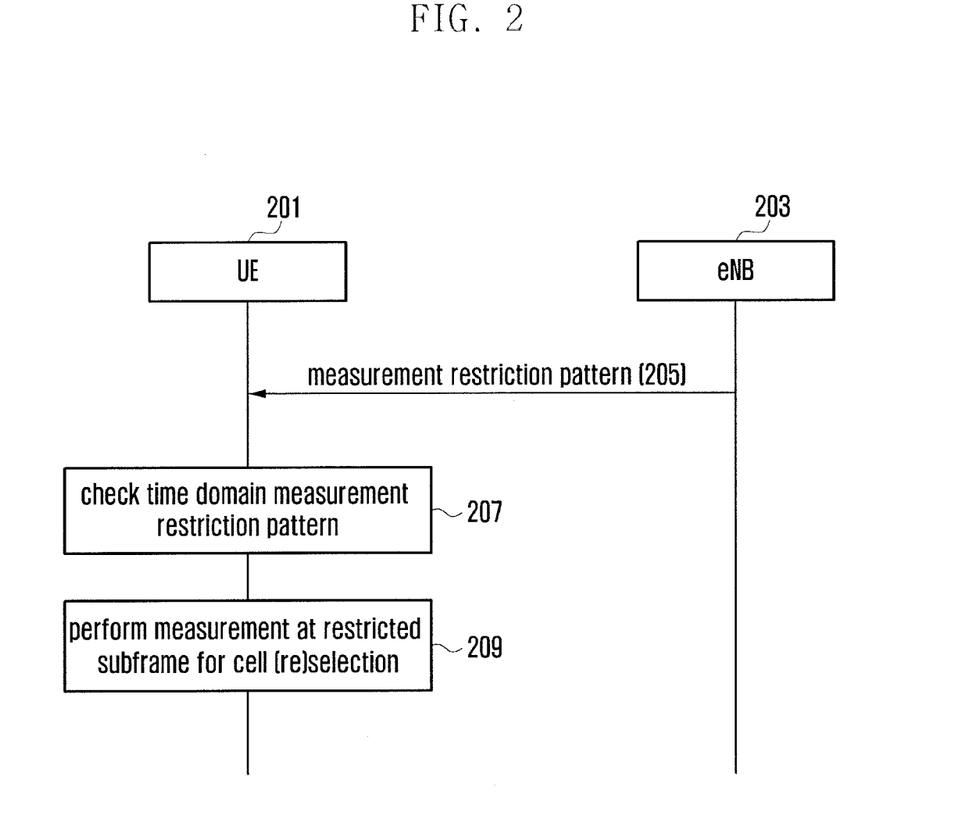
FIG. 2 is a signaling diagram illustrating the measurement procedure of the cell (re)selection method according to the first embodiment of the present invention.

FIG. 2 is a signaling diagram illustrating the measurement procedure of the cell (re)selection method according to the first embodiment of the present invention.

The UE 201 receives information on a measurement restriction pattern, i.e. the pattern related to the measurement restriction, from a base station (eNB) 203 at step 205. The measurement restriction pattern is the pattern indicating subframes at which the UE performs/suspends measurement. The UE 201 is capable of receiving the measurement restriction pattern through unicast, broadcast, or combination thereof. In both the connected mode and idle mode, the UE 201 is capable of receiving the measurement restriction pattern through broadcast from the eNB 203. In the connected mode, the UE 201 is capable of receiving the measurement restriction pattern through unicast.

In order to transmit the measurement restriction pattern, i.e. the pattern related to the measurement restriction, at least one of following signaling schemes can be used.

In order to transmit the measurement restriction pattern, Radio Resource Management/Radio Link Management (RRM/RLM) resource restriction of the serving cell can be used. The RRM/RLM resource restriction is a bitmap having a size of 40 bits. Each bit of the bitmap corresponds to a subframe. In order to manage mobility, when measuring the serving cell signal strength, the UE 201 performs measurement only at the subframes indicated by 1 in the bitmap.

In order to transmit the measurement restriction pattern, the RRM/RLM resource restriction of a neighbor cell. The RRM/RLM resource restriction of the neighbor cell is a bitmap having the size of 40 bits. Each bit of the bitmap corresponds to a subframe. In order to manage mobility, when measuring the serving cell signal strength, the UE 201 performs measurement only at the subframes indicated by 1 in the bitmap.

In order to transmit the measurement restriction pattern, Channel Quality Information/Channel State Information (CQI/CSI) resource restriction can be used. The CQI/CSI resource restriction of the serving cell is a bitmap having the size of 40 bits. Each bit of the bitmap corresponds to a subframe. When measuring CQI/CSI for the serving cell, the UE 201 performs measurement only at the subframes indicated by 1 in the bitmap.

If the information on the measurement restriction pattern is received as described above, the UE 201 checks the subframes at which measurement is restricted in the time domain at step 207. The UE 201 performs measurement only at the restricted subframes and uses the measurement result for cell selection or reselection at step 209.

Figure 3:
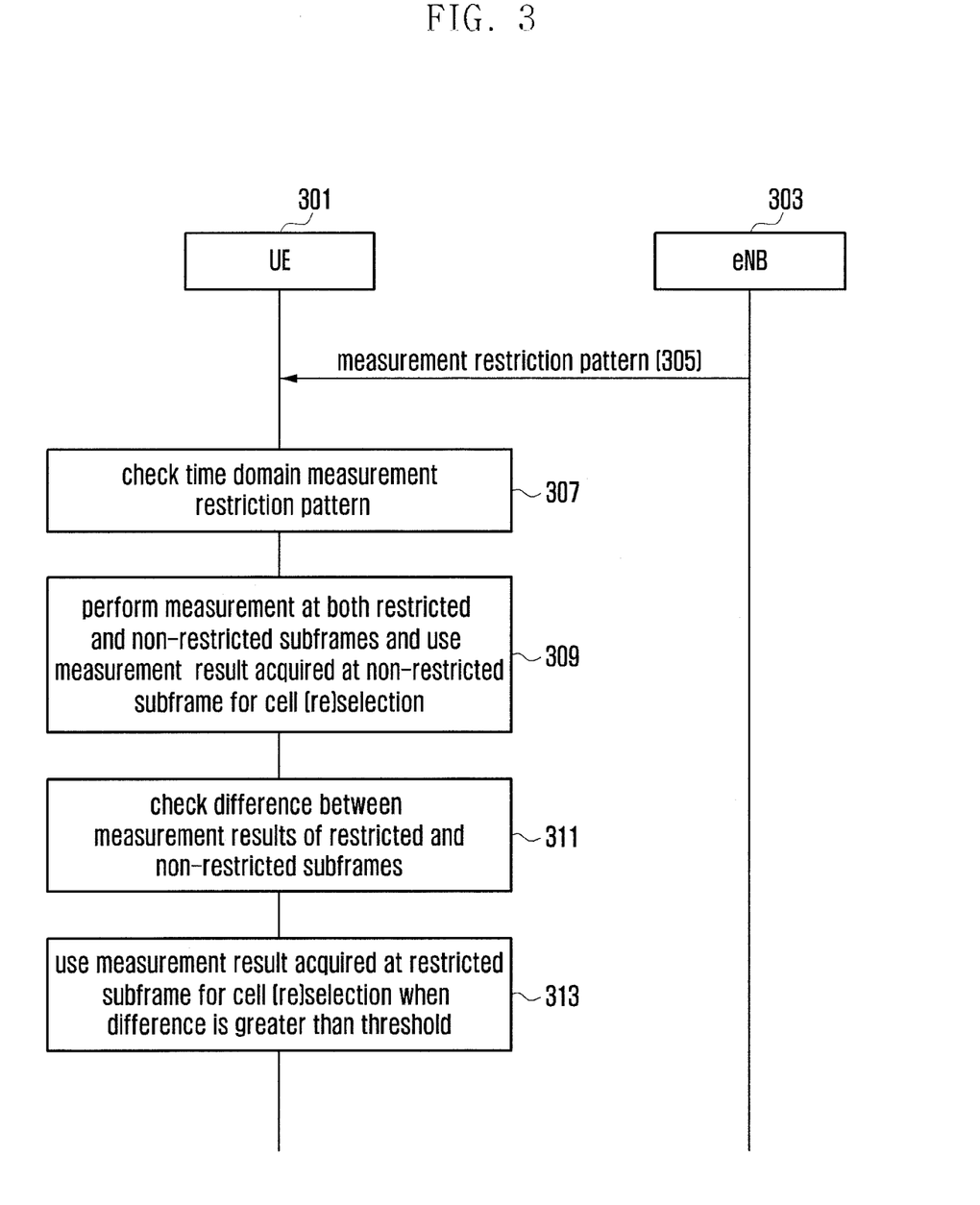
FIG. 3 is a signaling diagram illustrating the measurement procedure of the cell (re)selection method according to the second embodiment of the present invention.

FIG. 3 is a signaling diagram illustrating the measurement procedure of the cell (re)selection method according to the second embodiment of the present invention.

The UE 301 receives the information on the pattern related to measurement, i.e. measurement restriction pattern, from the eNB 303 at step 305. The UE 301 is capable of receiving the measurement restriction pattern through unicast, broadcast, or combination thereof. In both the connected mode and idle mode, the UE 301 is capable of receiving the measurement restriction pattern from the eNB 303 through broadcast. In the connected mode, the UE 301 is capable of receiving the measurement restriction pattern through unicast. If the information on the measurement restriction pattern is received, the UE 301 checks the subframes at which measurement is restricted at step 307. The UE 301 performs measurement at both the restricted subframes and the non-restricted subframes and uses the measurement result acquired at the non-restricted subframes for cell selection or reselection at step 309.

The UE 301 compares the RSRQs (or RSRPs) measured at the restricted and non-restricted subframes with each other to determine whether the difference therebetween is greater than a threshold value A at step 311. Here, the threshold value A can be signaled through a separate message. According to a modified embodiment, the UE 301 is capable of utilizing a predetermined threshold value A. In the case that the threshold value is signaled through a separate message, the UE 301 is capable of receiving the threshold value form the eNB 303 through unicast, broadcast, or combination thereof. In both the connected mode and idle mode, the UE 301 is capable of receiving the threshold value A through broadcast from the eNB 303. In the case that the difference between measurement results is greater than the threshold value A (or equal to the threshold value), the UE 301 uses the measurement result acquired at the restricted subframe for cell selection or cell reselection at step 313.

Figure 4:
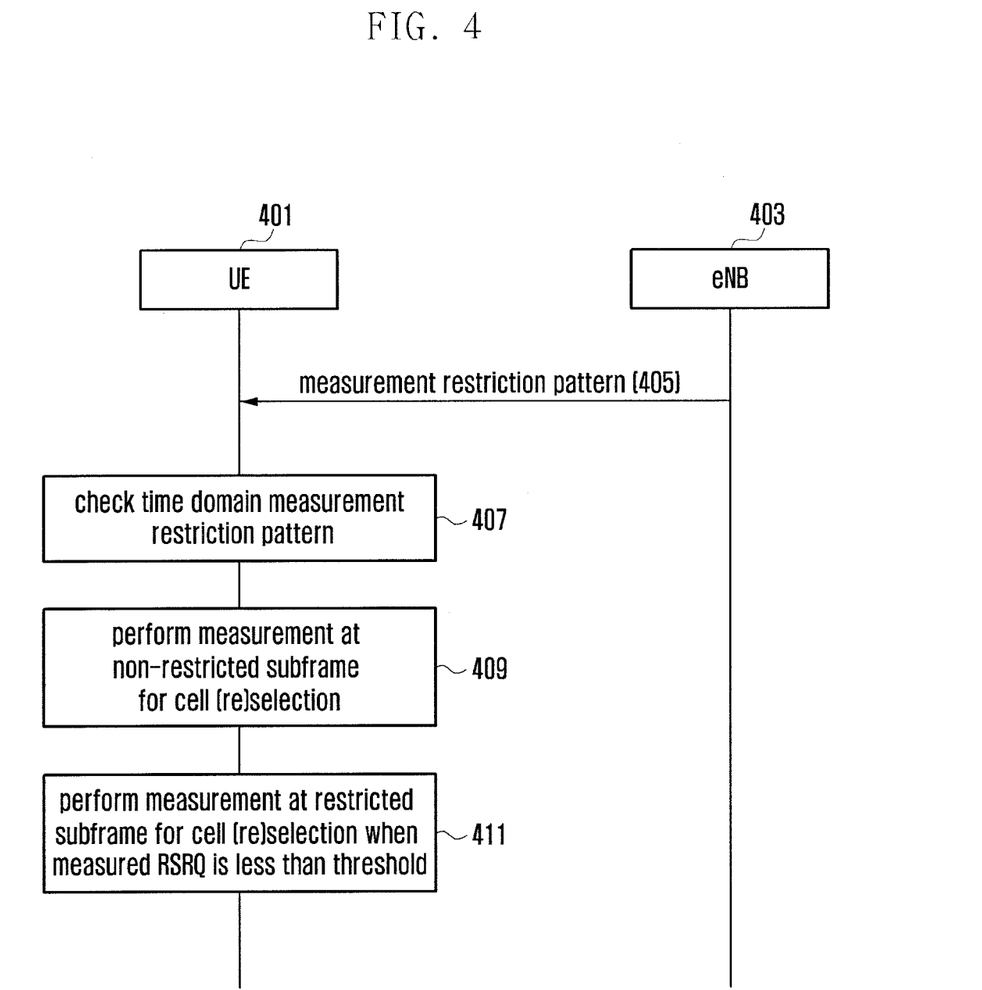
FIG. 4 is a flowchart illustrating the measurement procedure of the cell (re)selection method according to the third embodiment of the present invention.

FIG. 4 is a flowchart illustrating the measurement procedure of the cell (re)selection method according to the third embodiment of the present invention.

The UE 401 receives the measurement restriction pattern from the eNB 403 at step 405. The UE 401 is capable of receiving the measurement restriction pattern through unicast, broadcast, or combination thereof. In both the connected mode and idle mode, the UE 401 is capable of receiving the measurement restriction pattern through broadcast from the eNB 403. In the connected mode, the UE 401 is capable of receiving the measurement restriction pattern from the eNB 403 through unicast. If the information on the measurement restriction pattern is received, the UE 401 checks the subframes at which measurement is restricted at step 407. The UE 301 performs measurement at the non-restricted subframes and uses the measurement result for cell selection or reselection at step 409.

If the signal strength (e.g. RSRQ) measured at the non-restricted subframe is less than a threshold value B (or equal to the threshold value B), the UE 401 performs measurement at the restricted subframe to use the measurement result for cell selection or cell reselection. Here, the threshold value B can be signaled through a separate message. According to a modified embodiment, the UE 401 is capable of using a predetermined value as the threshold value B. In the case that the threshold value B is signaled through a separate message, the UE 401 in the connected mode or the idle mode is capable of receiving the threshold value B through broadcast from the eNB 403. In the connected mode, the UE 401 is capable of receiving the threshold value B through unicast from the eNB 403.

Figure 5:
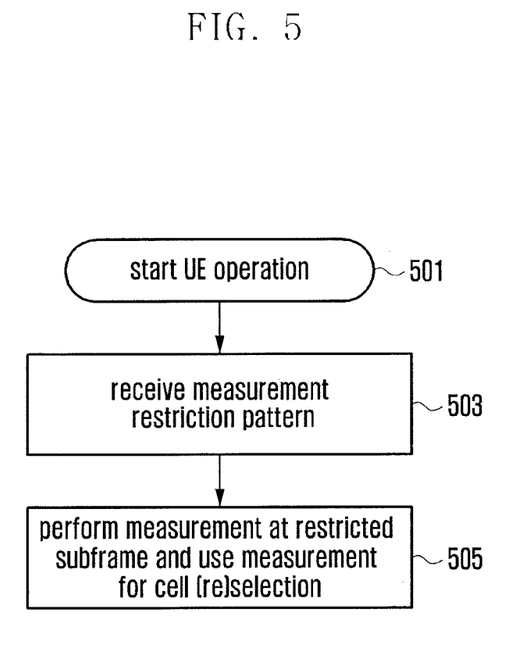
FIG. 5 is a flowchart illustrating the measurement procedure of the UE according to the first embodiment of the present invention.

FIG. 5 is a flowchart illustrating the measurement procedure of the UE according to the first embodiment of the present invention.

The operation of the UE 201 starts at step 501. The UE 201 receives the information on the pattern related to measurement at step 503. Next, the UE 201 performs measurement only at the measurement-restricted subframes indicated in the pattern and uses the measurement result for cell selection or reselection at step 505.

Figure 6:
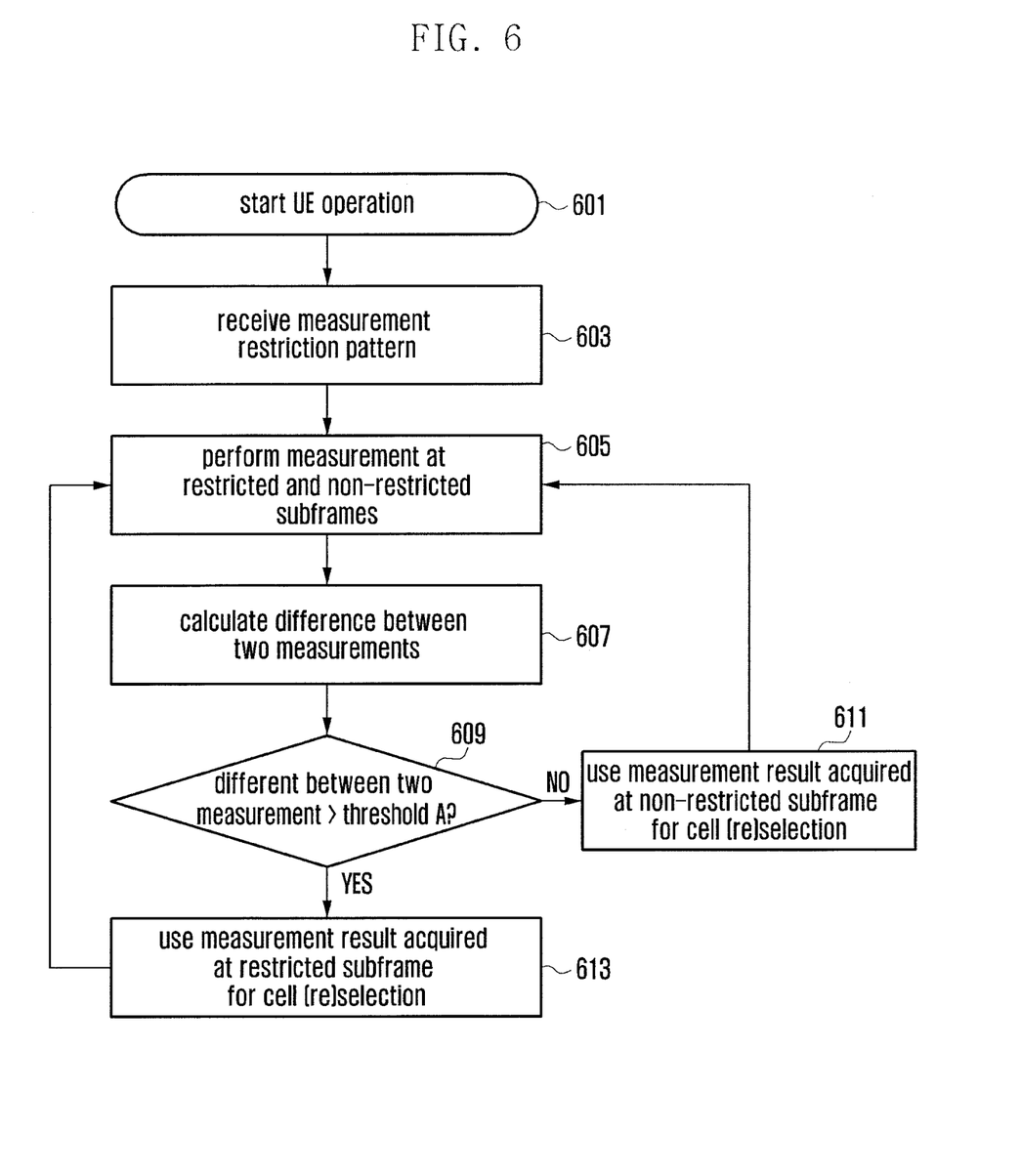
FIG. 6 is a flowchart illustrating the measurement procedure of the UE according to the second embodiment of the present invention.

FIG. 6 is a flowchart illustrating the measurement procedure of the UE according to the second embodiment of the present invention.

The operation of the UE 301 starts at step 601. The UE 301 receives the measurement restriction pattern at step 603. The UE 301 performs measurement at both the restricted subframes and non-restricted subframes indicated by the measurement restriction pattern at step 605. After measurement, the UE 301 calculates the difference between the measurement results (RSRPs or RSRQs) at the restricted and non-restricted subframes at step 607. The UE 301 determines whether the measurement result difference is greater than the threshold value A (or equal to the threshold value A) at step 609. If the measurement result difference is greater than the threshold value A, the UE 301 uses the measurement result acquired at the restricted subframe for cell selection or reselection at step 613. Otherwise, if the measurement result difference is less than the threshold value A, the UE 301 uses the measurement result acquired at the non-restricted subframe for cell selection or reselection.

Figure 7:
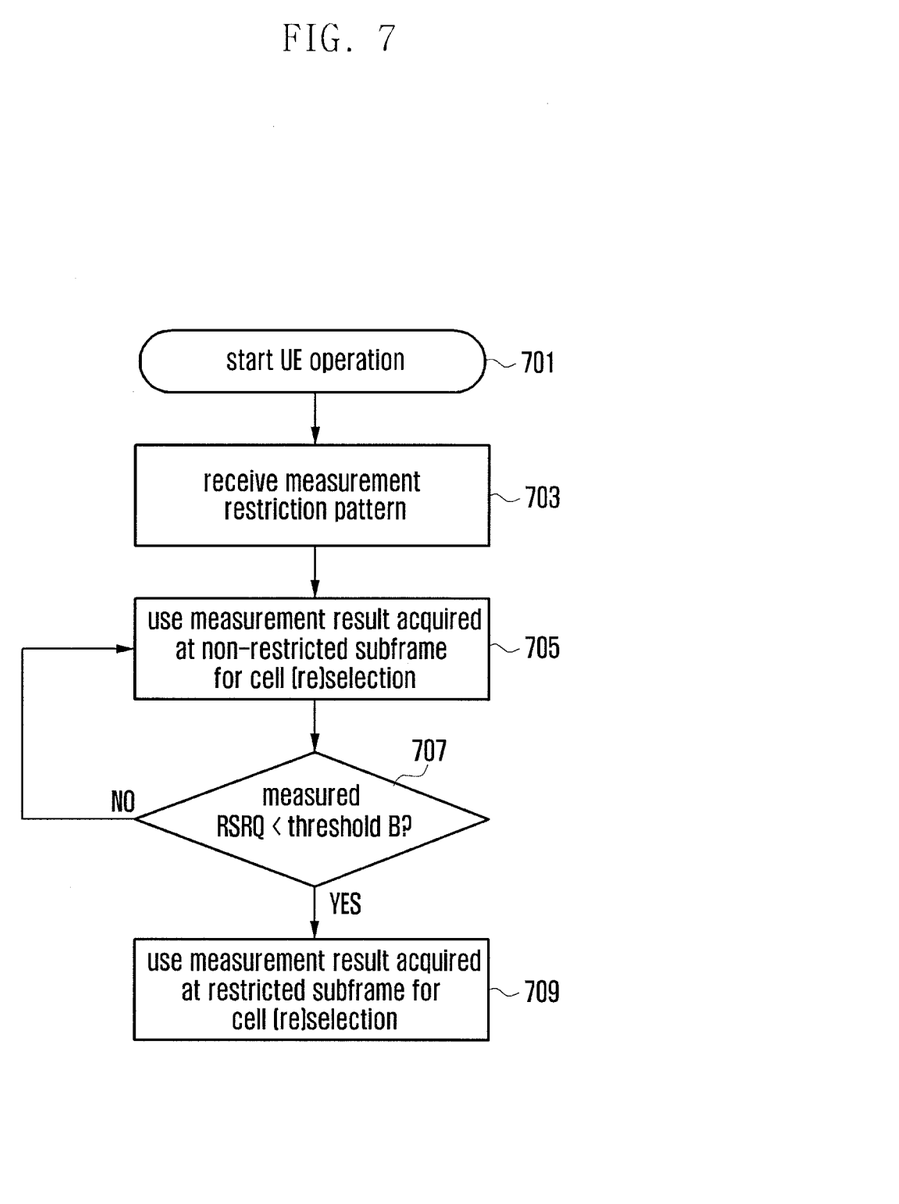
FIG. 7 is a flowchart illustrating the measurement procedure of the UE according to the third embodiment of the present invention.

FIG. 7 is a flowchart illustrating the measurement procedure of the UE according to the third embodiment of the present invention.

The operation of the UE 401 starts at step 701. The UE 401 receives the measurement restriction pattern at step 703. The UE 401 performs measurement at the non-restricted subframe indicated by measurement restriction pattern and uses the measurement result for cell selection or reselection at step 705. The UE 401 determines whether the RSRQ value of the measurement result is less than the threshold value B (or equal to the threshold value B) at step 707. If the RSRQ value is greater than the threshold value B, the UE 401 returns the procedure to step 705 to perform measurement at the non-restricted subframes continuously and use the measurement result for cell selection or reselection. If the RSRQ value is less than the threshold value B, the UE 401 performs measurement at the restricted subframe and uses the measurement result for cell selection or reselection at step 709.

Figure 8:
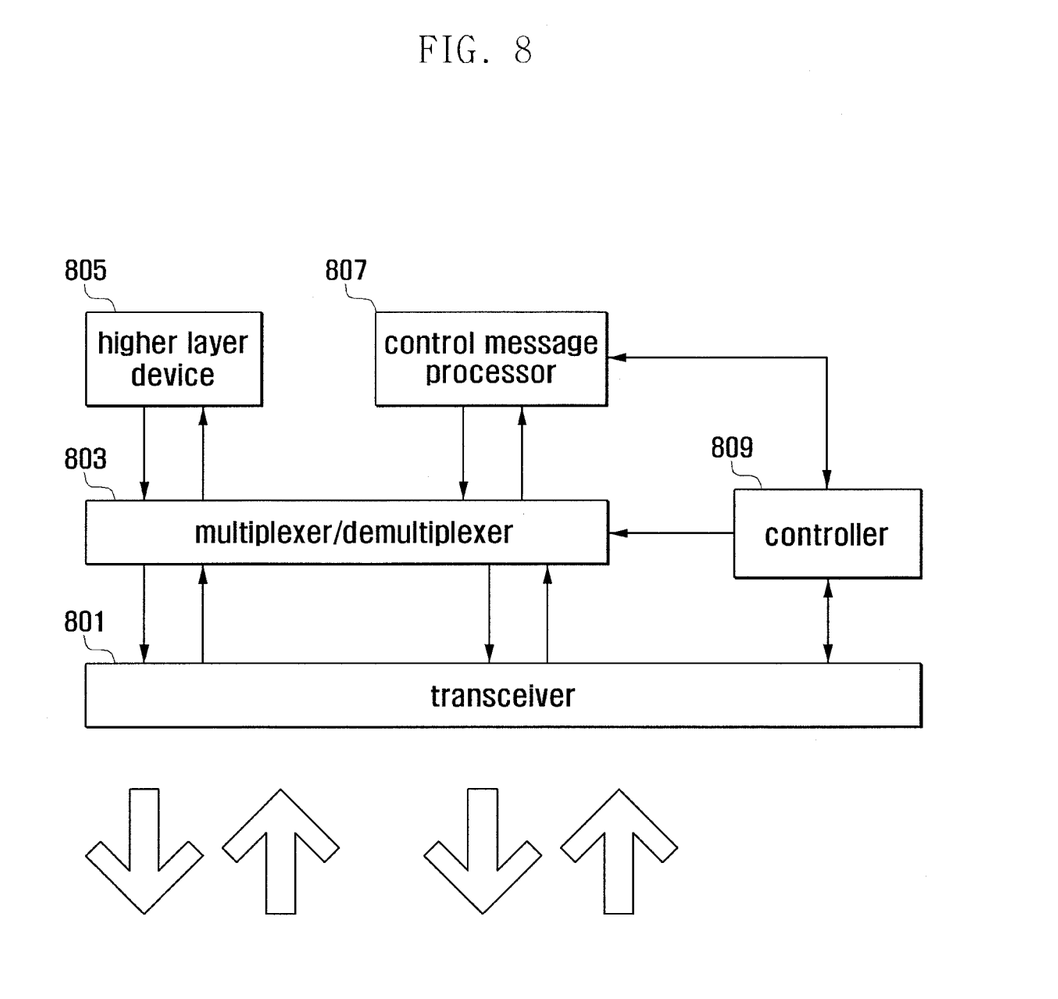
FIG. 8 is a block diagram illustrating the configuration of the UE according to an embodiment of the present invention.

FIG. 8 is a block diagram illustrating the configuration of the UE according to an embodiment of the present invention.

The higher layer device 805 transmits and receives data through higher layer. The control message processor 807 transmits and receives data through control messages. The control unit 809 controls the multiplexer/demultiplexer 803 to multiplex the data and transmit the data through the transceiver 801. The control unit 809 controls the transceiver 801 to receive a physical signal and controls the multiplexer/demultiplexer 803 to demultiplex the received signal. The control unit 809 transfers the messages to the higher layer device 805 or control message processor 807 according to the information on the messages.

According to an embodiment of the present invention, if the information message about the measurement restriction pattern from the eNB, the control message processor 807 of the UE analyzes the message to differentiate between the restricted subframes and non-restricted subframes. The control message processor 807 notifies the controller 809 of the type of subframe at which measurement is to be performed.

According to the first embodiment, the control message processor 807 instructs the controller 809 to perform measurement only at the restricted subframes for cell selection and reselection. According to the second embodiment, the control message processor 807 instructs the controller 809 to perform measurement at both the restricted and non-restricted subframes. The control message processor 807 receives the measurement result from the controller 809 back and instructs the controller 809 to perform measurement at the restricted subframe or not based on the measurement result difference. According to the third embodiment, the control message processor 807 receives the measurement result from the controller 809 and instructs the controller 809 to perform measurement at the restricted subframes when the RSRQ is less than the threshold value B.

With the proposed method, the UE in the idle mode is capable of measuring signal according to the measurement restriction pattern of eICIC and performing cell (re)selection in consideration of the interference from the neighbor cells in the HetNet environment, resulting in improvement of cell selection efficiency and accuracy.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention is described with reference to accompanying drawings illustrating [tile of the invention] in the embodiment of the present invention.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

Although the description has been made with reference to particular embodiments, the present invention can be implemented with various modification without departing from the scope of the present invention. Thus, the present invention is not limited to the particular embodiments disclosed but will include the following claims and their equivalents.

What is claimed is:

1. A cell selection method of a terminal in a heterogeneous network, the method comprising:
   receiving a measurement restriction pattern from a base station;
   identifying measurement-restricted subframes based on the measurement restriction pattern;
   measuring cell signals using the identified measurement-restricted subframes in an idle mode; and
   selecting a cell based on the measured cell signals in the idle mode.

2. The method of claim 1, wherein the selecting of the cell based on the measured cell signals in the idle mode comprises:
   identifying between measurement restricted and measurement non-restricted subframes based on the measurement restriction pattern;
   measuring the cell signals using the restricted and non-restricted subframes; and
   selecting, when a difference between the cell signals measured using the restricted and non-restricted subframes is greater than a threshold value, the cell based on the cell signal measured using the restricted subframe.

3. The method of claim 2, wherein the selecting of the cell based on the measured cell signals in the idle mode comprises selecting, when a difference between the cell signals measured the restricted and non-restricted subframes is equal to or less than a threshold value, the cell based on the cell signal measured using the non-restricted subframe.

4. The method of claim 1, wherein the selecting of the cell based on measured cell signals in the idle mode comprises:
   identifying between measurement restricted and measurement non-restricted subframes based on the measurement restriction pattern;
   measuring the cell signal using the non-restricted subframe; and
   selecting, when the measured cell signal is equal to or greater than a predetermined threshold value, the cell based on the cell signal measured using the non-restricted subframe.

5. The method of claim 4, wherein the selecting of the cell based on the measured cell signals in the idle mode comprises selecting, when the measured cell signal is less than the threshold value, the cell based on the cell signal measured using the restricted subframe.

6. The method of claim 2, further comprising receiving the predetermined threshold value.

7. The method of claim 4, further comprising receiving the predetermined threshold value.

8. A terminal for selecting a cell in a heterogeneous network, the terminal comprising:
   a transceiver configured to receive a measurement restriction pattern from a base station; and
   a controller configured to:
      identify measurement-restricted subframes based on the measurement restriction pattern,
      measure cell signals using the identified measurement-restricted subframes in an idle mode, and
      select a cell based on the measured cell signals in the idle mode.

9. The terminal of claim 8, wherein the controller is further configured, to:
   identify between measurement restricted and measurement non-restricted subframes based on the measurement restriction pattern,
   measure the cell signals using the restricted and non-restricted subframes, and
   select, when a difference between the cell signals measured using the restricted and non-restricted subframes is greater than a threshold value, the cell based on the cell signal measured using the restricted subframe.

10. The terminal of claim 9, wherein the controller is further configured to select, when a difference between the cell signals measured using the restricted and non-restricted subframes is equal to or less than a threshold value, the cell based on the cell signal measured using the non-restricted subframe.

11. The terminal of claim 8, wherein the controller is further configured to:
   identify between measurement restricted and measurement non-restricted subframes based on the measurement restriction pattern,
   measure the cell signal using the non-restricted subframe, and
   select, when the measured cell signal is equal to or greater than a predetermined threshold value, the cell based on the cell signal measured using the non-restricted subframe.

12. The terminal of claim 11, wherein the controller is further configured to select, when the measured cell signal is less than the threshold value, the cell based on the cell signal measured using the restricted subframe.

13. The terminal of claim 9, wherein the transceiver is further configured to receive the predetermined threshold value.

* * * * *